(12) United States Patent
Pursifull

(10) Patent No.: US 9,027,343 B2
(45) Date of Patent: May 12, 2015

(54) APPROACH FOR SUPPLYING VACUUM VIA A SUPERCHARGER

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 13/517,818

(22) Filed: Jun. 14, 2012

(65) Prior Publication Data

US 2013/0333665 A1    Dec. 19, 2013

(51) Int. Cl.
| | |
|---|---|
| *F02B 33/44* | (2006.01) |
| *F02D 23/00* | (2006.01) |
| *F02M 33/04* | (2006.01) |
| *F02B 33/00* | (2006.01) |
| *F02B 37/04* | (2006.01) |
| *F02B 37/12* | (2006.01) |
| *F02D 9/02* | (2006.01) |
| *F04F 5/20* | (2006.01) |
| *F04F 5/52* | (2006.01) |
| *F02B 33/34* | (2006.01) |
| *F02B 37/16* | (2006.01) |
| *F02B 37/18* | (2006.01) |
| *F02B 39/04* | (2006.01) |

(Continued)

(52) U.S. Cl.
CPC .................. *F02B 37/04* (2013.01); *F02B 37/12* (2013.01); *F02D 9/02* (2013.01); *F04F 5/20* (2013.01); *F04F 5/52* (2013.01); *F02D 23/00* (2013.01); *Y02T 10/144* (2013.01); *F02B 2037/125* (2013.01); *F02D 41/0065* (2013.01); *F02D 41/021* (2013.01); *F02B 33/34* (2013.01); *F02B 37/16* (2013.01); *F02B 37/18* (2013.01); *F02B 39/04* (2013.01); *F02D 41/0007* (2013.01); *F02D 41/003* (2013.01); *F02D 2250/08* (2013.01); *F02D 2250/41* (2013.01); *F02B 37/127* (2013.01)

(58) Field of Classification Search
CPC ........ F02B 37/04; F02B 37/12; F02B 37/013; F02M 25/07
USPC .............................. 60/612; 123/518–520, 562
See application file for complete search history.

(56) References Cited

U.S. PATENT DOCUMENTS

| | | | |
|---|---|---|---|
| 4,944,278 A | 7/1990 | Woodard | |
| 5,454,360 A | 10/1995 | Shimizu et al. | |
| 5,771,868 A * | 6/1998 | Khair | 123/568.12 |

(Continued)

FOREIGN PATENT DOCUMENTS

| | | | | |
|---|---|---|---|---|
| JP | 60081416 A * | 5/1985 | ............. | F01M 13/02 |
| JP | 07034885 A * | 2/1995 | ............. | F02B 33/00 |

(Continued)

OTHER PUBLICATIONS

English Translation of JP 2011-001877.*

*Primary Examiner* — Thomas Denion
*Assistant Examiner* — Jessica Kebea
(74) *Attorney, Agent, or Firm* — Julia Voutyras; Alleman Hall McCoy Russell & Tuttle LLP

(57) ABSTRACT

A method for supplying vacuum in an engine is disclosed. The method includes controlling a throttle valve positioned upstream of a supercharger arranged in series with and upstream of a turbocharger to draw a fluid from a vacuum line positioned intermediate the throttle valve and a supercharger inlet.

18 Claims, 3 Drawing Sheets

(51) Int. Cl.
*F02D 41/00* (2006.01)
*F02D 41/02* (2006.01)

(56) References Cited

U.S. PATENT DOCUMENTS

| | | | |
|---|---|---|---|
| 6,138,644 A * | 10/2000 | Saruwatari et al. | 123/520 |
| 6,257,209 B1 * | 7/2001 | Hyodo et al. | 123/520 |
| 6,412,277 B2 * | 7/2002 | Hagen et al. | 60/397 |
| 6,425,356 B1 | 7/2002 | Pischinger et al. | |
| 6,751,957 B2 | 6/2004 | Morgan et al. | |
| 6,945,236 B2 * | 9/2005 | Nakai et al. | 123/568.12 |
| 7,100,587 B2 * | 9/2006 | Ahlborn et al. | 123/572 |
| 7,284,541 B1 | 10/2007 | Uchida | 123/520 |
| 8,099,957 B2 * | 1/2012 | Boyer et al. | 60/612 |
| 8,109,259 B2 * | 2/2012 | Ulrey et al. | 123/572 |
| 8,640,458 B2 * | 2/2014 | Suhocki et al. | 60/611 |
| 2003/0140909 A1 * | 7/2003 | Criddle et al. | 123/572 |
| 2009/0007563 A1 * | 1/2009 | Cooper et al. | 60/600 |
| 2011/0030659 A1 * | 2/2011 | Ulrey et al. | 123/521 |
| 2011/0132311 A1 * | 6/2011 | Pursifull et al. | 123/184.56 |
| 2011/0132331 A1 * | 6/2011 | Pursifull | 123/478 |
| 2011/0132335 A1 * | 6/2011 | Pursifull et al. | 123/564 |
| 2011/0247594 A1 * | 10/2011 | Pursifull | 123/520 |
| 2011/0253111 A1 * | 10/2011 | Pursifull | 123/559.1 |
| 2012/0024267 A1 * | 2/2012 | Pursifull et al. | 123/564 |
| 2013/0074813 A1 * | 3/2013 | Thalhofer | 123/559.1 |
| 2013/0125544 A1 * | 5/2013 | Mond et al. | 60/611 |
| 2013/0255251 A1 * | 10/2013 | Tanaka et al. | 60/605.2 |
| 2013/0263590 A1 * | 10/2013 | Kempf et al. | 60/605.1 |
| 2014/0053547 A1 * | 2/2014 | Wade et al. | 60/599 |

FOREIGN PATENT DOCUMENTS

| | | | | |
|---|---|---|---|---|
| JP | 2005220822 A * | 8/2005 | | F02B 33/00 |
| JP | 2011001877 A * | 1/2011 | | |

* cited by examiner

APPROACH FOR SUPPLYING VACUUM VIA A SUPERCHARGER

BACKGROUND AND SUMMARY

Vacuum may be generated in an engine to create various actions that aid in operation of a vehicle. In one example, vacuum may be utilized to provide an actuating force for a device, such as for brake assist. In another example, vacuum may be utilized to circulate various fluids such as for exhaust gas recirculation (EGR), fuel vapor purge, crankcase venting, etc.

In one example, a vehicle includes an engine having a throttle valve that is positioned upstream of a compressor inlet of a turbocharger. The throttle valve is operable to throttle fluid (e.g., intake air) entering the compressor inlet to generate vacuum. Such vacuum may be directed to operate an actuator or circulate other fluids during engine operation.

However, the inventors herein have recognized potential issues with such an approach. The typical pre-compressor throttle can either control engine load or control pre-compressor vacuum but it cannot do both with complete independence. For example, throttling the compressor inlet of the turbocharger reduces flow circulation through the compressor that may result in a choke or stall. Moreover, transient flow conditions created by adjustment of the throttle valve may cause compressor surge. In either case, when such a condition occurs, drivability of the vehicle may be reduced and may be negatively perceived by a vehicle operator.

Thus, in one example, some of the above issues may be addressed by a method for supplying vacuum in an engine. The method includes controlling a throttle valve positioned upstream of a supercharger arranged in series with and upstream of a turbocharger to draw a fluid from a vacuum line positioned intermediate the throttle valve and a supercharger inlet.

By throttling the supercharger, vacuum may be generated for various uses throughout engine operation without restricting flow of the turbocharger. In this way, compressor stall/surge of the turbocharger may be reduced or eliminated.

Furthermore, in some implementations, the supercharger may be utilized to compensate for turbocharger lag. In particular, the supercharger may be operated to provide compression of intake air while the turbocharger is spinning up to operating speed. In one example, the method may include during a vehicle launch condition, adjusting the throttle valve to increase flow through the supercharger inlet and reduce flow from the vacuum line. In this way, more efficient supercharger operation may be prioritized over vacuum generation in order to speed up vehicle launch.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The present description relates to providing vacuum in an engine of a vehicle. More particularly, the present disclosure relates to an engine arrangement where a supercharger is positioned in series with and upstream of a turbocharger compressor in what may be referred to as a "twin charger" arrangement. For example, the supercharger may provide compression while the turbocharger spins up to operating speed in order to reduce or eliminate turbo lag. Once the turbocharger has reached operating speed, the supercharger can either continue compounding the pressurized air to the turbocharger inlet (yielding elevated intake pressures), or it can be bypassed and/or mechanically decoupled from the drive train via an electromagnetic clutch and bypass valve (increasing efficiency of the induction system). A throttle valve positioned upstream of the supercharger may be controlled to draw a fluid from a vacuum line positioned intermediate the throttle valve and a supercharger inlet to provide vacuum. While described in the implementation of a twin charger system, the vacuum throttle and supercharger arrangement is also applicable to an engine that merely includes a supercharger and not a turbocharger.

By throttling the supercharger to provide vacuum in the twin charger engine arrangement, the turbocharger can operate without being throttled in order to reach operating speeds more quickly and to allow for smoother operation. In this way, vacuum may be provided without causing turbocharger compressor stall/surge. Moreover, by providing vacuum via the supercharger, a separate vacuum pump and other hardware related to exhaust gas recirculation (EGR) may be eliminated from the engine. In this way, the production cost of the engine may be reduced.

The subject matter of the present disclosure is now described by way of example and with reference to certain illustrated embodiments. It will be noted that some of the figures included in this disclosure are schematic, and are identified as such. In the schematic figures, views of the illustrated embodiments are generally not drawn to scale; aspect ratios, feature size, and numbers of features may be purposely distorted to make selected features or relationships easier to see.

Figure 1:
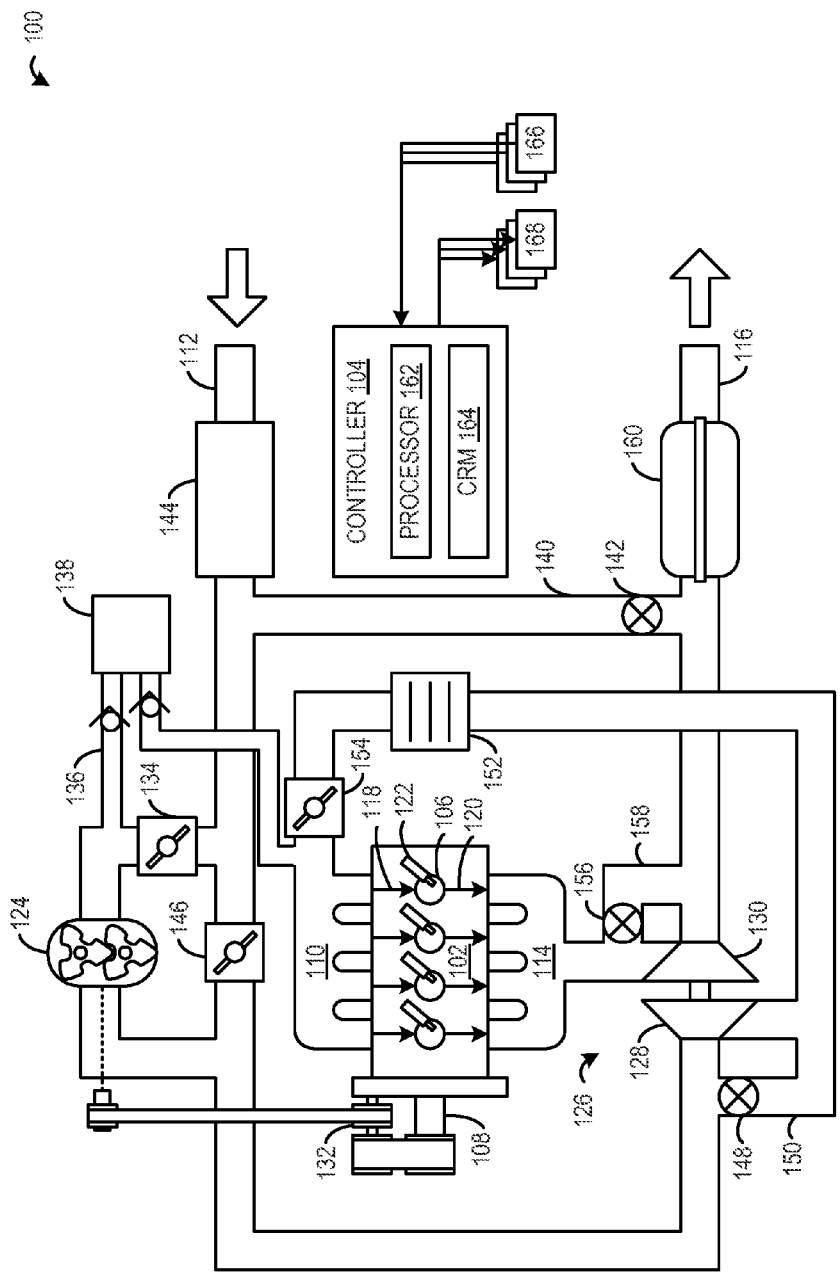
FIG. 1 schematically shows an example of an engine according to an embodiment of the present disclosure.

FIG. 1 schematically shows an example of an engine 102 that may be included in a propulsion system of a vehicle 100. The engine 102 may be controlled at least partially by a control system including controller 104 and by input from a vehicle operator. Combustion chambers (e.g., cylinder) 106 of engine 102 may each include a piston positioned therein that may be coupled to crankshaft 108 so that reciprocating motion of the piston is translated into rotational motion of the crankshaft. The crankshaft 108 may be coupled to at least one drive wheel of the vehicle via an intermediate transmission system to propel the vehicle.

The cylinders 106 may receive intake air from the intake manifold 110 via an intake passage 112 and may exhaust combustion gases via an exhaust manifold 114 to an exhaust passage 116. The intake manifold 110 and the exhaust manifold 114 can selectively communicate with the cylinders 106 via respective intake valves 118 and exhaust valves 120. The intake and exhaust valves may be controlled by a suitable valve actuation system such as a camshaft, an electric valve actuator (EVA), etc. and may utilize one or more of cam profile switching (CPS), variable cam timing (VCT), variable valve timing (VVT) and/or variable valve lift (VVL) systems to vary valve operation.

Fuel injectors 122 are shown coupled directly to combustion chambers 106 for injecting fuel directly therein, in a manner known as direct injection. The fuel injectors 122 may inject fuel in proportion to a pulse width of signal FPW received from controller 104 via an electronic driver. Fuel may be delivered to the fuel injector by a fuel system including a fuel tank, a fuel pump, and a fuel rail. In some embodiments, the cylinders 106 may alternatively or additionally include a fuel injector arranged in the intake manifold 110 in a configuration that provides what is known as port injection of fuel into the intake port upstream of the combustion chambers. An ignition system can provide an ignition spark to combustion chambers 106 via a spark plug in response to spark advance signal SA from controller 104, under select operating modes.

A supercharger 124 and a turbocharger 126 may be arranged in a twin charger configuration in the engine. In other words, the supercharger 124 may be arranged in series with and upstream of a compressor 128 the turbocharger 126 in the intake passage 112. The supercharger 124 and the turbocharger 126 may be operable to increase air charge density and pressure in the intake manifold 110. Under some conditions, the supercharger may provide compression while the turbocharger provides little or no compression, such as during a launch condition when the turbocharger is spinning up to operating speed. Under some conditions, the turbocharger may provide compression while the supercharger provides little or no compression, such as during moderate load conditions when the turbocharger has achieved operating speed. Under some conditions, the supercharger and the turbocharger may both provide compression, such as at high load conditions.

In some embodiments, the supercharger 124 may be operatively coupled to the crankshaft 108 such that the supercharger 124 may be at least partially driven by rotation of the crankshaft 108. In some embodiments, the supercharger 124 may be selectively driven by the crankshaft 108 via an electromagnetic clutch 132. The clutch 132 may be controlled by the controller 104 to allow the supercharger to freewheel or not be driven by the crankshaft, under some conditions. In some implementations, the clutch may be omitted. For the turbocharger 126, the compressor 128 may be at least partially driven by a turbine 130 (e.g., via a shaft) arranged along exhaust passage 116.

The vehicle 100 may include a plurality of valves to control various engine operating parameters, such as air charge density, manifold pressure, vacuum, etc. A vacuum throttle valve 134 may be positioned along the intake passage 112 upstream of the supercharger 124 and downstream of an air filter 144 positioned along the intake passage 112. The vacuum throttle valve 134 may be controlled via the controller 104 to draw a fluid from a vacuum line 136 that is positioned intermediate the vacuum throttle valve 134 and an inlet of the supercharger 124.

A vacuum consumption device 138 may be fluidly coupled with the vacuum line 136. The vacuum throttle valve 134 may be controlled via the controller 104 to supply vacuum to the vacuum consumption device 138. The vacuum may be supplied to the vacuum consumption device to facilitate device actuation, provide suction/facilitate fluid flow, etc. For example, the vacuum consumption device 138 may include at least one of a brake booster, a crankcase ventilation system, an EGR system, and a fuel vapor purge canister. Depending on operating conditions of the engine, the fluid drawn into the supercharger inlet to provide vacuum to the vacuum consumption device may include intake air in addition to one or more of actuator vacuum, recirculated exhaust gas, purged fuel vapor, and vented crankcase gas.

In some embodiments, since the vacuum throttle valve 134 is operable to supply vacuum to the vacuum line 136 by drawing fluid into the supercharger inlet, the engine 102 may not include a vacuum pump device (e.g., a venturi pump, ejector, aspirator, etc.) fluidly coupled with the vacuum line. By eliminating the vacuum pump device, production costs of the engine may be reduced.

A supercharger bypass valve 146 is positioned along the intake passage 112 upstream of the compressor 128 of the turbocharger 126. The supercharger bypass valve 146 provides a route for intake air or other fluid to bypass the supercharger and acts as a blow-off valve when boost exceeds a set point. For example, during a low engine load condition such as at idle or at light throttle cruising, increased boost pressure may increase pumping work to push air into the intake manifold and correspondingly may increase pumping losses that lower engine efficiency and fuel economy. As such, the bypass valve 146 may be controlled by the controller 104 to allow at least some air to bypass the supercharger under such conditions. It will be appreciated that under some conditions where the bypass valve 146 is open at least some intake air may be throttled by the vacuum throttle valve 134 into the supercharger inlet to provide vacuum to the vacuum line 136.

The compressor 128 of the turbocharger 126 may be positioned in the intake passage 112 downstream of the supercharger 124 and the supercharger bypass valve 146. Intake air collectively flowing from the upstream devices may enter an inlet of the compressor 128 with substantially little or no throttling. In other words, the upstream devices may provide suitable flow through the compressor so as to reduce or inhibit stalling or surging in the compressor. Furthermore, a compressor bypass valve 148 is positioned along a compressor bypass passage 150 that is fluidly coupled with the intake passage 112. The compressor bypass valve 148 provides a route for intake air to bypass the compressor 128 of the turbocharger and acts as a blow-off valve when boost exceeds a set point.

A charge air cooler 152 is positioned in intake passage 112 downstream of the compressor 128 of the turbocharger. The charge air cooler 152 cools intake air that is compressed by the compressor 128 to increase the density of the intake air charge provided to the cylinders 106.

A throttle valve 154 is positioned in the intake passage 112 downstream of the intake air cooler 152 and the compressor 128. In this particular example, the position of throttle valve 154 may be varied by controller 104 via a signal provided to an electric motor or actuator included with the throttle valve 154, a configuration that is commonly referred to as electronic throttle control (ETC). In this manner, the throttle valve 154 may be operated to vary the intake air provided to the cylinders 106.

The turbine 130 of the turbocharger is driven by exhaust gas exhausted from the cylinders 106, which drives the compressor 128 to provide compression. A waste gate or turbine bypass valve 156 is arranged in a turbine bypass passage 158 that is fluidly coupled with the exhaust passage 116. The turbine bypass valve 156 provides a route for exhaust gas to bypass the turbine 130 of the turbocharger when boost exceeds a set point. It will be appreciated that one or more of the bypass valves/passages may be omitted in some embodiments.

An emission control device 160 is shown arranged along the exhaust passage 116. The device 160 may be a three way catalyst (TWC), NOx trap, various other emission control devices, or combinations thereof. In some embodiments, during operation of engine 102, emission control device 160 may be periodically reset by operating at least one cylinder of the engine within a particular air/fuel ratio.

The controller 104 is shown in FIG. 1 as a microcomputer, including a microprocessor unit 162 and an electronic storage medium (a.k.a., a computer-readable storage medium) 164 for executable programs and calibration values. For example, the computer-readable storage medium may include one or more of a read-only memory chip 106, random access memory, and keep alive memory.

The controller 104 may receive various signals from sensors 166 coupled to engine 102 and vehicle 100. Sensor 166 may include at least one boost or pressure sensor positioned in the intake passage downstream of the supercharger (and/or the turbocharger) to provide an indication of boost pressure, a vacuum pressure sensor positioned intermediate the vacuum throttle valve and the supercharger, a mass air flow sensor and a manifold air pressure sensor for providing respective signals MAF and MAP to controller 104. An exhaust gas sensor may be coupled to exhaust passage 116 upstream of emission control device 16. The exhaust gas sensor may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Furthermore, sensors 166 may provide indications of engine coolant temperature (ECT) from a temperature sensor coupled to a cooling sleeve of the engine; a profile ignition pickup signal (PIP) from a Hall effect sensor (or other type) coupled to the crankshaft 108; a throttle position (TP) from a throttle position sensor coupled to any or all of the throttle valves. Engine speed signal, RPM, may be generated by controller 12 from signal PIP.

Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder.

The controller 104 commands various engine actuators 168 based on received sensor signal indicative of operating conditions of the vehicle. For example, the controller 104 may adjust or control the state of the various actuators including valves such as the vacuum throttle valve 134, the supercharger bypass valve 146, the compressor bypass valve 148, the throttle valve 154, the turbine bypass valve 156, the EGR valve 142, intake valves 118, and exhaust valves 120 based on various operating conditions. Furthermore, the actuators 168 that may be controlled by controller 104 may include the vacuum consumption device 138, the clutch 132, and other suitable actuators related to engine operation.

Computer readable medium read-only memory 164 can be programmed with computer readable data representing instructions executable by processor 162 for performing the methods described below as well as other variants that are anticipated but not specifically listed.

In one example, the controller 104 may be configured to control the vacuum throttle valve 134 to draw a fluid from the vacuum line 136 into the inlet of the supercharger 124 to supply vacuum to the vacuum consumption device 138. For example, the vacuum throttle valve may be partially closed to create a pressure differential between the supercharger inlet and the intake passage that supplies vacuum to vacuum consumption device via the vacuum line. In the case of a brake booster, the vacuum may be supplied to increase braking force of the brake booster. In the case of a crankcase ventilation system, vacuum may be supplied to draw fuel vapors from the crankcase of the engine into the intake passage. In the case of a fuel vapor purge canister, vacuum may be supplied to draw fuel vapors from the canister into the intake passage.

In some implementations, the supercharger may be used intermittently for compression, such as to provide compression while the turbocharger is spinning up to operating speed. For example, once the turbocharger is spun-up to an operating speed that is able to satisfy the engine load, the supercharger may sit idle or may be bypassed. Furthermore, in an engine configuration that includes a supercharger and does not include a turbocharger, under some conditions, the supercharger may be operated to satisfy the engine load. In other conditions, the engine load may be satisfied without the use of the supercharger, and the supercharger may sit idle or may be bypassed. During such conditions where the supercharger would otherwise sit idle, the supercharger may be operated in cooperation with the vacuum throttle valve to provide vacuum to the vacuum consumption device. In one example, the controller 104 may be configured to while an engine load is being satisfied without use of the supercharger, use the supercharger as a vacuum pump to provide actuator vacuum for a brake booster. In another example, the controller 104 may be configured to while an engine load is being satisfied without use of the supercharger, use the supercharger as a vacuum pump to ingest fuel vapor from a fuel vapor storage media (e.g., a fuel vapor canister). In yet another example, the controller 104 may be configured to while an engine load is being satisfied without use of the supercharger, use the supercharger as a vacuum pump to ingest crankcase gasses into the engine. In yet another example, the controller 104 may be configured to while an engine load is being satisfied without use of the supercharger, use the supercharger as a pump to ingest exhaust gas into the engine.

In one example, the controller 104 may be configured to adjust a supercharger bypass valve to direct at least some fluid downstream of the supercharger responsive to the turbocharger speed being greater than a threshold. In other words, the supercharger may operate with the supercharger bypass valve at least partially open when the turbocharger is spinning at operating speed in order to reduce compression added by the supercharger so as not to increases boost pressure beyond a commanded threshold.

In another example, the supercharger and the turbocharger may both provide compression and the supercharger may be throttled by the vacuum throttle valve to provide vacuum to the vacuum consumption device. In either example, operation of the supercharger in cooperation with the vacuum throttle valve to supply vacuum eliminates the need for a separate vacuum pump device and other hardware associated with the low pressure EGR system.

Generally, the vacuum throttle valve may be controlled to provide as much vacuum as possible up to limits allowed by the operating conditions of the engine. However, the vacuum throttle valve need not be controlled to always provide maximum vacuum, under certain conditions.

In one example, the controller 104 may be configured to during a vehicle launch condition, adjust the vacuum throttle valve to increase flow through the supercharger inlet and reduce flow from the vacuum line. For example, during the vehicle launch condition, the vacuum throttle valve may be adjusted to be wide open to provide substantially little or no throttling of the supercharger in order for the supercharger to provide compression quickly. In one example, a vehicle launch condition may include where the vehicle is accelerator pedal tip-in while the turbocharger is below an operating speed. In some cases, the vehicle may be stopped or at idle, and control of the supercharger may be concentrated on increasing intake compression relative to other conditions. By adjusting control of the supercharger to prioritize increasing boost over supplying vacuum, turbocharger lag and vehicle launch time may be reduced.

Furthermore, in one example the controller 104 may be configured to adjust the throttle valve to increase flow through the vacuum line relative to flow through the vacuum line during the vehicle launch condition responsive to a turbocharger speed being greater than a threshold. For example, the vacuum throttle valve may be adjusted to have a smaller opening than during the vehicle launch condition. Once the turbocharger has reached an operating speed to provide suitable compression (e.g., no lag), control of the supercharger can be prioritized to supplying vacuum.

The configuration illustrated above enable various methods for supplying vacuum in an engine of a motor vehicle. Accordingly, some such methods are now described, by way of example, with continued reference to above configurations. It will be understood, however, that these methods, and others fully within the scope of the present disclosure, may be enabled via other configurations as well.

Figure 2:
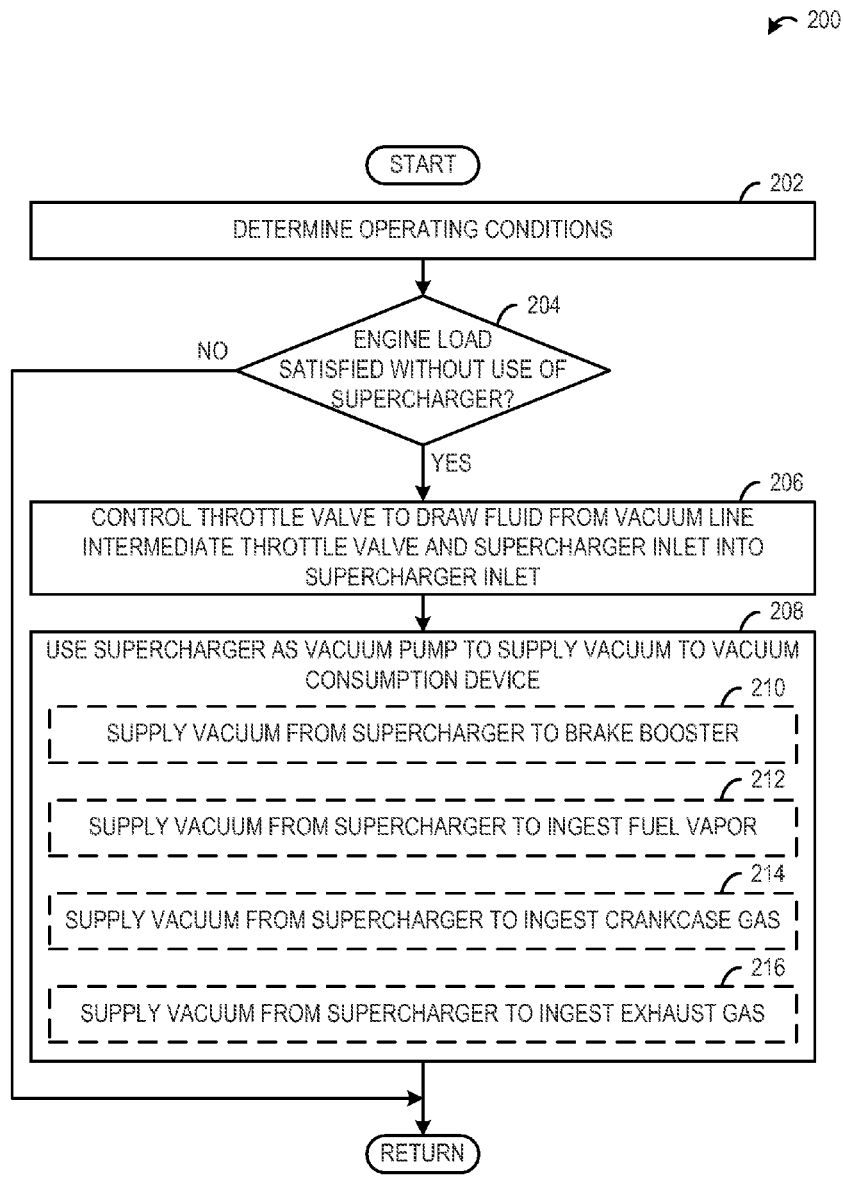
FIG. 2 shows an example of a method for supplying vacuum in an engine according to an embodiment of the present disclosure.

FIG. 2 shows an example of a method 200 for supplying vacuum in an engine according to an embodiment of the present disclosure. In one example, the method 200 may be executed by the controller 104 of FIG. 1. It will be appreciated that the method may be implemented in either a twin charged engine configuration or an engine configuration that includes a supercharger and does not include a turbocharger.

At 202, the method 200 includes determining operating conditions. Determining operating conditions may include receiving sensor signals and determining a state of actuators coupled to the vehicle.

At 204, the method 200 includes determining whether engine load is satisfied without use of the supercharger. For example, engine load may be satisfied without the use of the supercharger when engine load is suitably low/manifold pressure is suitably high for the supercharger to not be used. As another example, engine load may be satisfied without the use of the supercharger when a turbocharger is spun-up to provide suitable compression to meet the engine load in a twin charger configuration. If engine load is satisfied without use of the supercharger, then the method 200 moves to 206. Otherwise, the method 200 returns to other operations.

At 206, the method 200 includes controlling the vacuum throttle valve to draw fluid from a vacuum line that is positioned intermediate the vacuum throttle valve and the supercharger into the supercharger inlet. For example, the vacuum throttle valve may be partially closed to create a pressure differential between the vacuum line and the supercharger inlet that causes fluid to be sucked out of the vacuum line. For example, the fluid drawn from the vacuum line may include one or more of actuator vacuum, recirculated exhaust gas, purged fuel vapor, and vented crankcase gas.

At 208, the method 200 includes using the supercharger as a vacuum pump to supply vacuum to a vacuum consumption device. In some implementations, the supercharger can be used to draw an external fluid other than intake air into the intake passage.

In some embodiments, using the supercharger as a vacuum pump includes, at 210, supplying actuator vacuum from the supercharger to a brake booster. The supplied vacuum may be used as actuator vacuum to increase the brake force provided by the brake booster. In some embodiments, using the supercharger as a vacuum pump includes, at 212, supplying vacuum to ingest fuel vapor from a fuel vapor storage media. For example, the supercharger may supply vacuum to purge fuel vapor from a fuel vapor canister into the intake manifold so that the fuel vapor can be consumed during combustion. In some embodiments, using the supercharger as a vacuum pump includes, at 214, supplying vacuum to ingest crankcase gasses into the engine. For example, the supercharger may supply vacuum to draw crankcase gas from a crankcase ventilation system into the intake manifold so that the crankcase gas can be consumed during combustion. In some embodiments, using the supercharger as a vacuum pump includes, at 216, supplying vacuum to ingest exhaust gasses into the engine. For example, the supercharger may supply vacuum to draw exhaust gas from an EGR system into the intake manifold so that the exhaust gas can be consumed during combustion. These fluids (actuator vacuum, recirculated exhaust gas, purged fuel vapor, and vented crankcase gas) previously have been drawn into the engine via intake manifold vacuum. But when intake manifold vacuum is not available, the supercharger "pump" can be used to draw in these gasses during conditions that would otherwise be unsuitable.

By throttling the supercharger, vacuum can be provided for various operations in the engine without the use of a separate vacuum pump device. More particularly, in a twin charged engine configuration, since the supercharger is throttled to provide vacuum, the turbocharger may be operated without being throttled, which may reduce or eliminate compressor stall/surge. In twin charger systems, the supercharger may be used transiently and thus the supercharger may be available for actuator vacuum generation and ingestion of various gasses. In supercharger-only systems, the supercharger may be available for vacuum production at low engine loads. Braking and vehicle acceleration tend to occur exclusively and thus the use of the supercharger as a vacuum pump for brake boosting is serendipitous.

Figure 3:
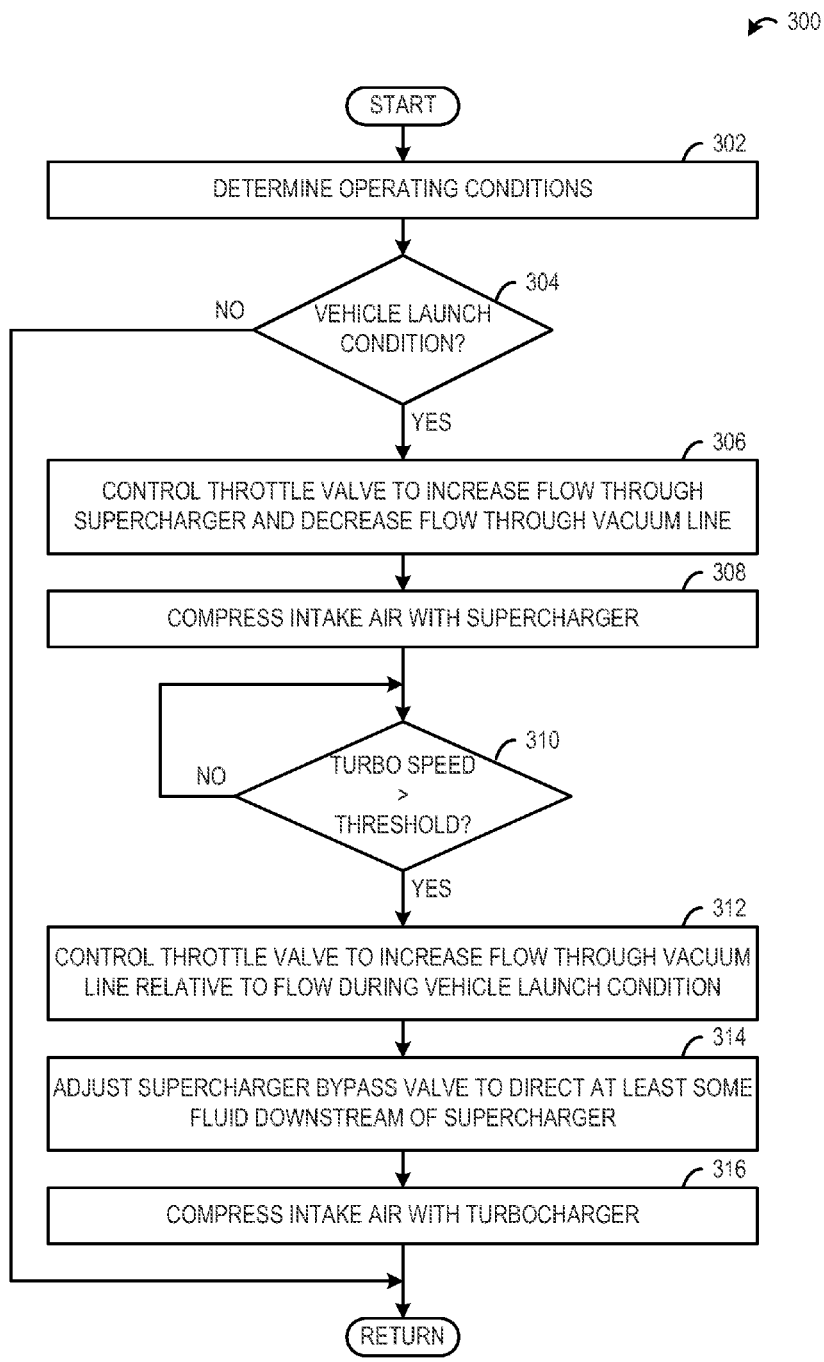
FIG. 3 shows an example of another method for supplying vacuum in an engine according to an embodiment of the present disclosure.

FIG. 3 shows an example of this serendipity where when the supercharger is otherwise not used, it is available for vacuum generation or ingestion of various gasses. FIG. 3 shows an example of another method 300 for supplying vacuum in an engine according to an embodiment of the present disclosure. In one example, the method 300 may be executed by the controller 104 of FIG. 1. At 302, the method 300 includes determining operating conditions. Determining operating conditions may include receiving sensor signals and determining a state of actuators coupled to the vehicle. At 304, the method 300 includes determine whether there is a vehicle launch condition. In one example, the vehicle launch condition may be based on a turbocharger speed as indicated by boost pressure of the turbocharger, engine speed, vehicle speed, accelerator pedal position, etc. If there is a vehicle launch condition, the method 300 moves to 306. Otherwise, the method 300 returns to other operations.

At 306, the method 300 includes controlling the vacuum throttle valve to increase flow through the supercharger inlet and reduce flow from the vacuum line. For example, the vacuum throttle valve may be adjusted wide open to increase fluid flow to the supercharger inlet. Opening the vacuum throttle valve decreases the pressure differential between the intake passage and the vacuum line, and thus flow from the vacuum line may be reduced relative to other operating conditions.

At 308, the method 300 includes compressing intake air with the supercharger before the turbocharger is spun-up to an operating speed. Operation of the supercharger may be controlled to prioritize controlling engine load/increasing boost over supplying vacuum during the launch condition in order to compensate for turbocharger lag.

At 310, the method 300 includes determining whether a turbocharger speed is greater than a threshold. For example, the threshold may be an operational speed of the turbocharger to provide a suitable boost pressure. If the turbocharger speed is greater than the threshold, then the method 300 moves to 310. Otherwise, the method 300 returns to 308.

It will be appreciated that it can be determined when a vehicle launch condition ends in any suitable manner without departing from the scope of the present disclosure. For example, engine load/vehicle speed may be used determine when a vehicle launch conditions ends instead of turbocharger speed.

At 312, the method 300 includes adjusting the vacuum throttle valve to increase flow from the vacuum line relative to during the launch condition. In other words, if fluid was drawn from the vacuum line during the launch condition at a first rate, then the flow rate may be adjusted to a second flow rate that is greater than the first flow rate responsive to the turbocharger speed being greater than the threshold. Once the turbocharger is able to provide boost suitable to meet the engine load, the supercharger may be controlled to prioritize supplying vacuum. For example, after vehicle launch when the turbocharger has spun-up, adjusting the vacuum throttle valve may include reducing the opening as compared to during launch to draw in external fluid other than intake air into the intake passage via vacuum. In one example, the external fluid other than intake air may include crankcase gases, fuel vapor purge gases, recirculated exhaust gases, etc.

In some implementations, boost provided by the supercharger may be reduced once the turbocharger speed is greater than the threshold, and at 314, the method 300 may include adjusting a supercharger bypass valve to direct at least some fluid downstream of the supercharger responsive to the turbocharger speed being greater than the threshold. Once the turbocharger is able to provide boost, the supercharger may be at least partially bypassed so that the engine does not become over-boosted, while maintaining operation of the supercharger to supply vacuum.

At 316, the method 300 includes compressing intake air with the turbocharger. Once the turbocharger has reached operating speed, compression can be handled by the turbocharger while the supercharger maintains operation to supply vacuum for other operations. In some embodiments, the supercharger may continue compounding the pressurized air to the turbocharger inlet to yielding elevated intake pressures instead of being bypassed.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An engine method, comprising:
controlling a throttle valve positioned upstream of a supercharger arranged upstream of a turbocharger compressor, the compressor arranged in an engine intake passage and the supercharger and throttle valve arranged in a supercharger passage coupled to the intake passage, to draw a fluid from a vacuum line positioned intermediate the throttle valve and a supercharger inlet through the supercharger and then through the compressor; and
adjusting a supercharger bypass valve arranged in the intake passage downstream of an inlet of the supercharger passage, upstream of an outlet of the supercharger passage, and upstream of the compressor, to direct at least some fluid around the supercharger and then through the compressor.

2. The method of claim 1, further comprising:
during a vehicle launch condition, adjusting the throttle valve and the supercharger bypass valve to increase flow through the supercharger inlet and reduce flow from the vacuum line.

3. The method of claim 2, further comprising:
adjusting the throttle valve and the supercharger bypass valve to increase flow through the vacuum line relative to flow through the vacuum line during the vehicle launch condition responsive to a turbocharger speed being greater than a threshold.

4. The method of claim 1, further comprising:
supplying vacuum to a vacuum consumption device fluidly coupled with the vacuum line.

5. The method of claim 4, wherein the vacuum consumption device includes at least one of a brake booster, a crankcase ventilation system, an exhaust gas recirculation system, and a fuel vapor.

6. The method of claim 1, wherein the fluid includes one or more of actuator vacuum, recirculated exhaust gas, purged fuel vapor, and vented crankcase gas.

7. An engine comprising:
a turbocharger;
a supercharger arranged upstream of the turbocharger;
a throttle valve positioned upstream of the supercharger;
a vacuum line positioned intermediate the throttle valve and a supercharger inlet; and
a controller including a processor and a non-transitory computer-readable medium having instructions that when executed by the processor:
control the throttle valve to draw a fluid from the vacuum line;
during a vehicle launch condition, adjust the throttle valve to increase flow through the supercharger inlet and reduce flow from the vacuum line; and
adjust the throttle valve to increase flow through the vacuum line, relative to flow through the vacuum line during the vehicle launch condition, responsive to a turbocharger speed being greater than a threshold.

8. The engine of claim 7, wherein the non-transitory computer-readable medium has instructions that when executed by the processor:
adjust a supercharger bypass valve to direct at least some fluid downstream of the supercharger responsive to the turbocharger speed being greater than a threshold.

9. The engine of claim 7, further comprising:
a vacuum consumption device fluidly coupled with the vacuum line and wherein the non-transitory computer-readable medium has instructions that when executed by the processor:
supply vacuum to the vacuum consumption device.

10. The engine of claim 9, wherein the vacuum consumption device includes at least one of a brake booster, a crankcase ventilation system, and a fuel vapor purge canister.

11. The engine of claim 7, wherein the engine does not include a vacuum pump device fluidly coupled with the vacuum line.

12. The engine of claim 7, wherein the fluid includes one or more of actuator vacuum, recirculated exhaust gas, purged fuel vapor, and vented crankcase gas.

13. A method for supplying vacuum in an engine, comprising:
while an engine load is being satisfied without use of a supercharger, controlling the supercharger as a vacuum pump to supply vacuum to a vacuum consumption device; and
adjusting a supercharger bypass valve arranged in an engine intake passage downstream of an inlet of a passage in which the supercharger is arranged and upstream of an outlet of the passage in which the supercharger is arranged to direct at least some fluid downstream of the supercharger while the supercharger is acting as a vacuum pump.

14. The method of claim 13, wherein controlling the supercharger as a vacuum pump includes supplying actuator vacuum to a brake booster.

15. The method of claim 13, wherein controlling the supercharger as a vacuum pump includes supplying vacuum to draw fuel vapor from a fuel vapor storage media into the intake passage.

16. The method of claim 13, wherein controlling the supercharger as a vacuum pump includes supplying vacuum to draw crankcase gas from a crankcase ventilation system into the intake passage.

17. The method of claim 13, wherein controlling the supercharger as a vacuum pump includes supplying vacuum to draw exhaust gas from an exhaust gas recirculation passage into the intake passage upstream of the supercharger bypass valve.

18. A method for an engine, comprising:
during launch, compressing intake air with a supercharger before a turbocharger is spun-up,
the supercharger and a throttle valve arranged in a supercharger passage coupled to an engine intake passage;
a compressor of the turbocharger arranged in the engine intake passage downstream of the supercharger;
after launch, compressing intake air with the compressor and drawing in external fluid other than intake air into the intake via vacuum generated by reducing the throttle opening directly upstream of the supercharger as compared to during launch,
while adjusting a supercharger bypass valve arranged in the intake passage upstream of the compressor to direct at least some fluid downstream of the supercharger and then through the compressor.

* * * * *